United States Patent
Cha (10) Patent No.: US 9,136,725 B2
(45) Date of Patent: Sep. 15, 2015

(54) METHOD AND APPARATUS TO CHARGE BATTERY OF MOBILE DEVICE

(75) Inventor: Jae-deok Cha, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 510 days.

(21) Appl. No.: 13/533,419

(22) Filed: Jun. 26, 2012

(65) Prior Publication Data

US 2013/0082643 A1 Apr. 4, 2013

(30) Foreign Application Priority Data

Oct. 4, 2011 (KR) .......... 10-2011-0100764
Nov. 21, 2011 (KR) .......... 10-2011-0121737

(51) Int. Cl.
*H02J 7/00* (2006.01)
*H02J 7/04* (2006.01)

(52) U.S. Cl.
CPC ............. *H02J 7/0068* (2013.01); *H02J 7/0077* (2013.01); *H02J 7/042* (2013.01)

(58) Field of Classification Search
CPC . H02J 7/022; H02J 7/0093; H02J 2007/0059; H02J 7/0068; H01M 10/44
USPC .......................................... 320/107
See application file for complete search history.

(56) References Cited

U.S. PATENT DOCUMENTS

| | | | | |
|---|---|---|---|---|
| 8,330,413 | B2 * | 12/2012 | Lazarovich et al. | 320/107 |
| 2005/0141252 | A1 * | 6/2005 | Mollo | 363/101 |
| 2009/0309551 | A1 * | 12/2009 | Lazarovich et al. | 320/138 |
| 2010/0231176 | A1 * | 9/2010 | Lee et al. | 320/162 |

\* cited by examiner

*Primary Examiner* — Arun Williams
(74) *Attorney, Agent, or Firm* — Staas & Halsey LLP (57) ABSTRACT

A charging method and apparatus, the apparatus including: an adaptor to receive power from a predetermined power source and output a first voltage; a narrow voltage direct current (NVDC) charging unit to convert the first voltage into a second voltage, and supply power to a battery and a system terminal of a mobile device; and a control unit to control the NVDC charging unit to adjust a charging current to be supplied to the battery based on a state of the system terminal, wherein the second voltage is lower than the first voltage.

15 Claims, 6 Drawing Sheets

METHOD AND APPARATUS TO CHARGE BATTERY OF MOBILE DEVICE

CROSS-REFERENCE TO RELATED APPLICATIONS

This application claims the benefit of Korean Patent Application No. 10-2011-0100764, filed on Oct. 4, 2011 and Korean Patent Application No. 10-2011-00121737, filed on Nov. 21, 2011 in the Korean Intellectual Property Office, the disclosure of which is incorporated herein in its entirety by reference.

BACKGROUND OF THE INVENTION

1. Field of the Inventive Concept

The present inventive concept relates to a method and apparatus to charge a battery of a mobile device, and more particularly, to a method and apparatus to quickly charge a battery in a narrow voltage direct current (NVDC) system to supply power to a battery of a mobile device and a system terminal thereof.

2. Description of the Related Art

As mobile devices have been recently developed and improved, a "battery consuming time" is one of usability items sensitive to users. In addition to the "battery consuming time", a "battery charging time" is also an item very important to users.

The conventional battery charge system is designed to charge a 2parallel 3series (2P3S) lithium-ion battery commonly used as the battery of the mobile device for 2 hours 30 minutes to 3 hours. A capacity of a charging unit to supply the current to the battery needs to increase in order to more quickly charge the battery. Such an increase in the capacity of the charging unit involves an increase in the size thereof, which is likely to be disadvantageous to a user of the mobile device that focuses on portability of the mobile device.

Therefore, a method of reducing a battery charging time of a mobile device in view of a user's requirement of a "battery consuming time" and the "mobile charging time" while maintaining portability of the mobile device is needed.

SUMMARY OF THE INVENTION

The present inventive concept provides a method and apparatus to quickly charge a battery of a mobile device while using the battery for a long period of time.

The present inventive concept also provides a method and apparatus to quickly charge a battery of a mobile device while minimizing a size and weight of the mobile device.

Additional features and utilities of the present general inventive concept will be set forth in part in the description which follows and, in part, will be obvious from the description, or may be learned by practice of the general inventive concept.

Embodiments of the present inventive concept provide a charging apparatus including: an adaptor to receive power from a predetermined power source and output a first voltage; a narrow voltage direct current (NVDC) charging unit to convert the first voltage into a second voltage, and supply power to a battery and a system terminal of a mobile device; and a control unit to control the NVDC charging unit to adjust a charging current to be supplied to the battery based on a state of the system terminal, wherein the second voltage is lower than the first voltage.

The second voltage may be 9 to 12 V.

The charging apparatus may further include: a sensing unit to sense a user input manipulation for the mobile device, wherein the control unit determines the status of the system terminal according to the user input manipulation sensed by the sensing unit.

The status of the system terminal may be one of an on status, a standby status, and an off status, wherein the control unit controls the NVDC charging unit in such a way that the charging current is greater if the status of the system terminal is in the standby status or the off status than in the on status.

The sensing unit may sense a capacity of the battery, wherein, if the status of the system terminal is in the on status, the control unit allows a first charging current to be supplied to the battery if the capacity of the battery is equal to a previously set capacity of the battery, and, allows a second charging current greater than the first charging current to be supplied to the battery if the capacity of the battery is higher than the previously set capacity of the battery.

If the status of the system terminal is in the standby status or the off status, the control unit may allow a third charging current greater than the first charging current to be supplied to the battery if the capacity of the battery is equal to the previously set capacity of the battery, and allow a fourth charging current greater than the third charging current to be supplied to the battery if the capacity of the battery is higher than the previously set capacity of the battery.

The charging apparatus may further include a sensing unit to measure a system terminal current consumed by the system terminal, wherein the control unit controls the NVDC charging unit to increase the charging current as the system terminal current is reduced.

The charging apparatus may further include a sensing unit to sense the capacity of the battery, wherein the control unit controls the NVDC charging unit to increase the charging current as the capacity of the battery increases.

Embodiments of the present inventive concept also provide a method of charging a battery of a mobile device by using a predetermined charging device, the method including: (a) receiving power from a predetermined power source and outputting a first voltage; (b) converting the first voltage into a second voltage, and supplying power to a battery and a system terminal of a mobile device; (c) adjusting a charging current supplied to the battery based on a state of the system terminal; and (d) charging the battery with the charging current, wherein the second voltage is lower than the first voltage.

The second voltage may be 9 to 12V.

The method may further include: (e) sensing a user input manipulation for the mobile device, and determining the status of the system terminal.

The status of the system terminal may be one of an on status, a standby status, and an off status, wherein operation (c) includes: adjusting the charging current to be greater if the status of the system terminal is in the standby status or the off status than in the on status.

The method may further include: (f) sensing a capacity of the battery, wherein operation (c) includes: if the status of the system terminal is in the on status, allowing a first charging current to be supplied to the battery if the capacity of the battery is equal to a previously set capacity of the battery, and, allowing a second charging current greater than the first charging current to be supplied to the battery if the capacity of the battery is higher than the previously set capacity of the battery.

Operation (c) may include: if the status of the system terminal is in the standby status or the off status, allowing a third charging current greater than the first charging current to be supplied to the battery if the capacity of the battery is equal to the previously set capacity of the battery, and allowing a fourth charging current greater than the third charging current to be supplied to the battery if the capacity of the battery is higher than the previously set capacity of the battery.

The method may further include: (g) measuring a system terminal current consumed by the system terminal, wherein operation (c) includes: increasing the charging current as the system terminal current is reduced.

The method may further include: (h) sensing the capacity of the battery, wherein operation (c) includes: increasing the charging current as the capacity of the battery increases.

Embodiments of the present inventive concept also provide a non-transitory computer-readable storage medium storing a computer program to execute the method of charging a battery of a mobile device by using a predetermined charging device.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

As used herein, expressions such as "at least one of," when preceding a list of elements, modify the entire list of elements and do not modify the individual elements of the list.

Figure 1:
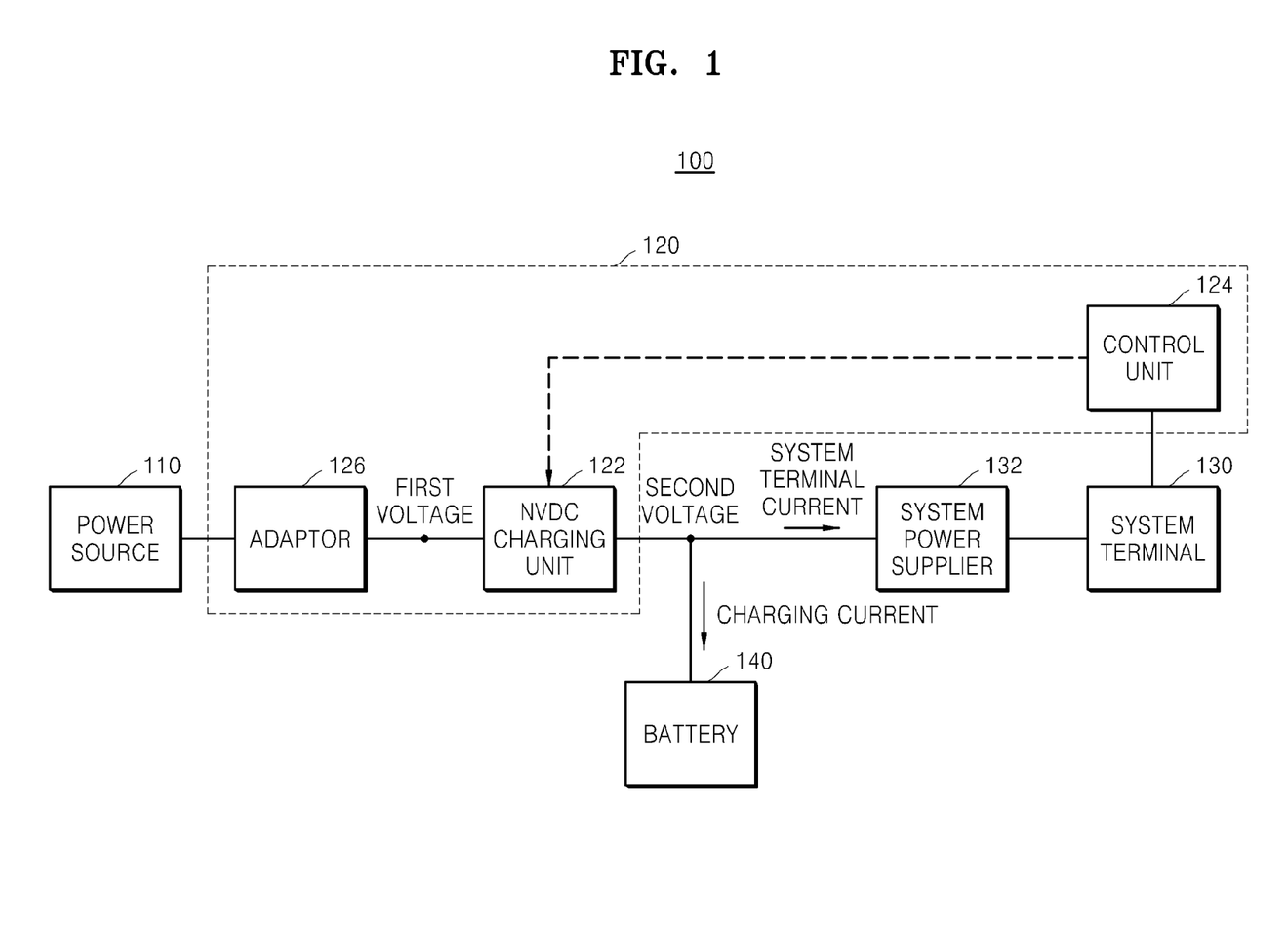
FIG. 1 is a block diagram of a mobile device including a charging apparatus, according to an embodiment of the present inventive concept.

FIG. 1 is a block diagram of a mobile device 100 including a charging apparatus 120, according to an embodiment of the present inventive concept.

Referring to FIG. 1, the charging apparatus 120 according to the present embodiment includes a narrow voltage direct current (NVDC) charging unit 122, a control unit 124 and an adaptor 126.

The mobile device 100 according to the present embodiment is a portable device, and includes the charging apparatus 120, a system terminal 130, a system power supplier 132, and a battery 140. In FIG. 1, a power source 110 is connected to the mobile device 100.

The power source 110 may be an AC power source or a DC power source. The power source 110 may be physically separated from the charging apparatus 120. More specifically, the power source 110 may be connected to the charging apparatus 120 via a predetermined connection port, etc.

The system terminal 130 includes at least one of a platform controller hub (PCH), a graphic processing unit (GPU), and various modules. That is, the system terminal 130 includes various apparatuses and devices of the mobile device 100 that receive power from the power source 110 and consume power.

The system terminal 130 receives power through the system power supplier 132. The system power supplier 132 includes a DC-DC converter. The system power supplier 132 changes power applied from the NVDC charging unit 122 and applies the changed power to various modules of the system terminal 130.

The battery 140 is a preliminary power supply apparatus to supply power to the system terminal 130 of the mobile device 100 if the power source 110 is not connected to the mobile device 100. The battery 140 may be a 2parallel 3series (2P3S) lithium-ion battery commonly used in a mobile device, but the present inventive concept is not limited thereto.

The charging apparatus 120 includes the NVDC charging unit 122, the control unit 124 and the adaptor 126, receives power from the power source 110, and supplies power to at least one of the system terminal 130 and the battery 140 of the mobile device 100.

The adaptor 126 receives power from the power source 110, and outputs the first voltage. The first voltage may be 19 V.

The NVDC charging unit 122 receives power from the adaptor 126, and supplies power to the system terminal 130 and the battery 140 of the mobile device 100. Also, the NVDC charging unit 122 changes the first voltage outputted from the adaptor 126 to the second voltage. The second voltage may be 9 to 12V.

The NVDC charging unit 122 increases an efficiency of the DC-DC converter of the system power supplier 132 and increases a battery consuming time by reducing a deviation of voltage applied to the system power supplier 132 of the mobile device.

More specifically, the NVDC charging unit 122 receives power from the adaptor 126, outputs a charging current to the battery 140, charges the battery 140, and outputs a system terminal current to the system terminal 130. The NVDC charging unit 122 may be a DC-DC converter, and is designed to have an electricity capacity to cover both electricity capacities of the system terminal 130 and the battery 140. The NVDC charging unit 122 charges the battery 140 of the mobile device 100 according to constant current constant voltage (CCCV) characteristics.

The NVDC charging unit 122 according to the present embodiment may adjust a current flowing through the battery 140, i.e. the charging current. A technology of adjusting an output current using the DC-DC converter is well known, and thus a detailed description thereof will be omitted here.

The control unit 124 may determine a status of the system terminal 130 or the battery 140 and control the NVDC charging unit 122 to adjust the charging current. For example, the control unit 124 measures a charging current output to the battery 140, and transmits to the NVDC charging unit 122 a control signal to adjust a large amount or a small amount of the charging current to be output from the NVDC charging unit 122. The NVDC charging unit 122 adjusts the charging current according to the control signal of the control unit 124. An operation of the control unit 124 to determine the status of the system terminal 130 or the battery 140 and to control the NVDC charging unit 122 to adjust the charging current will be described in more detail below.

Figure 2:
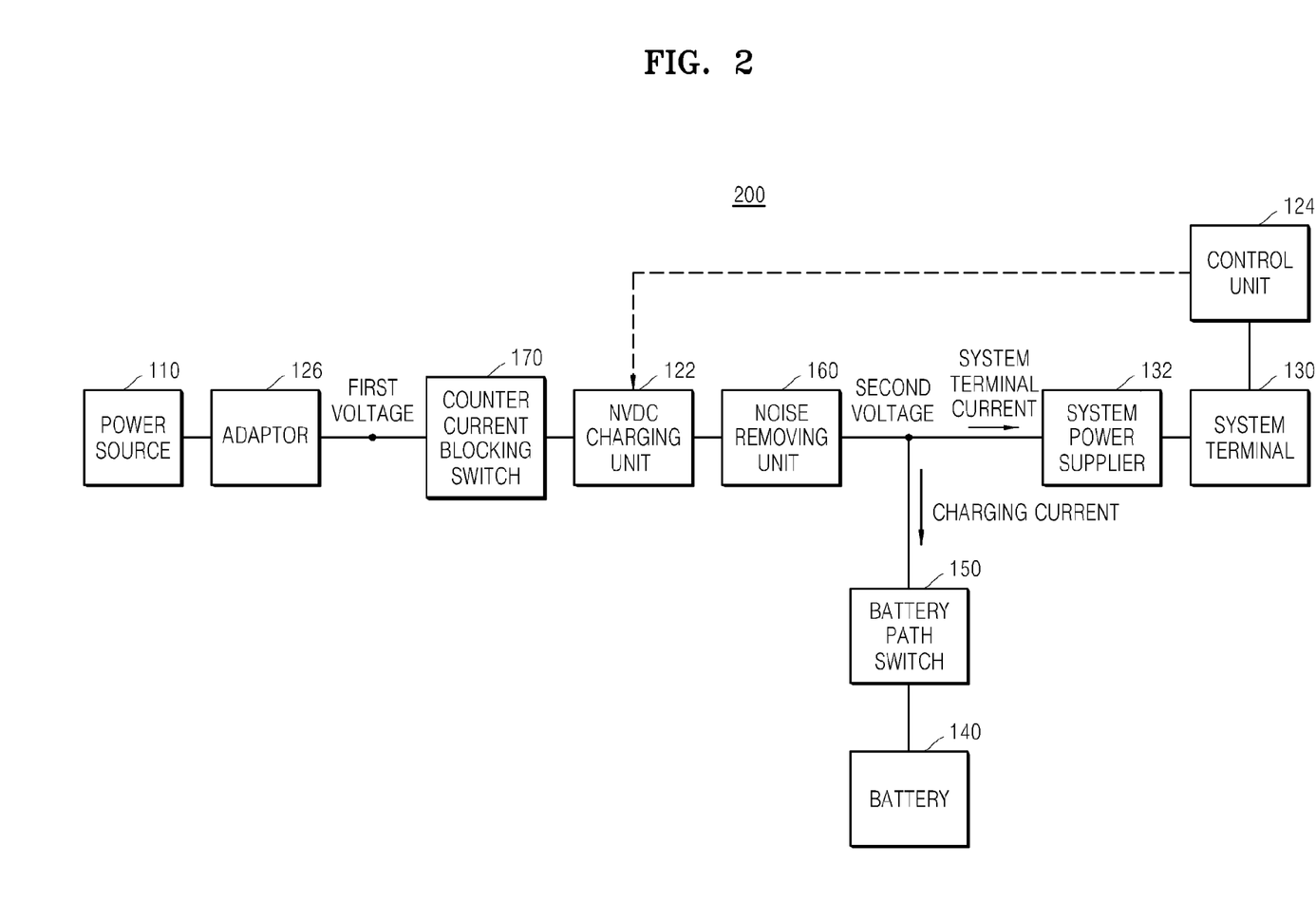
FIG. 2 is a block diagram of a mobile device including a charging apparatus, according to another embodiment of the present inventive concept.
Figure 3:
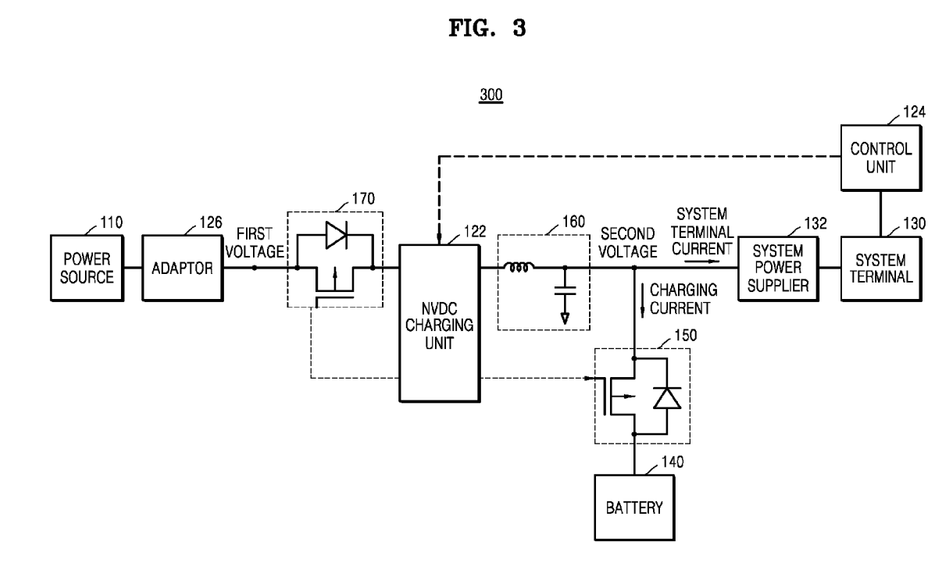
FIG. 3 is a block diagram of a mobile device including a charging apparatus, according to another embodiment of the present inventive concept.

FIGS. 2 and 3 are block diagrams of mobile devices 200 and 300 including the charging apparatus 120, according to other embodiments of the present inventive concept. The elements of FIGS. 2 and 3 corresponding to those of FIG. 1 denote the same reference numerals. Referring to FIG. 2, the mobile device 200 according to the present embodiment may further include at least one of a battery path switch 150, a noise removing unit 160, and a countercurrent blocking switch 170.

Hereinafter, redundant descriptions between FIGS. 1 and 2 will be omitted.

The battery path switch 150 supplies power to the battery 140 from the power source 110 if the power source 110 is connected to the mobile device 200, and adjusts power to be supplied to the system terminal 130 from the battery 140 if the power source 110 is separated from the mobile device 200. In FIG. 3, the battery path switch 150 is a switch in which a field effect transistor (FET) and a diode are coupled to each other. If the power source 110 is connected to the mobile device 200, power is supplied to the battery 140 from the power source 110 through the FET. If the power source 110 is separated from the mobile device 200, power is supplied to the system terminal 130 from the battery 140 through the diode.

The noise removing unit 160 removes a noise component of DC power output from the NVDC charging unit 122. That is, the noise removing unit 160 removes a riffle of the DC power to stably supply the DC power to the system terminal 130 and the battery 140. Although an inductor and a capacitor are used as the noise removing unit 160 in FIG. 3, it will be obvious to one of ordinary skill in the art that the present inventive concept is not limited to the inductor and the capacitor.

The countercurrent blocking switch 170 prevents a user from getting an electric shock due to power that is output from the battery 140 and is exposed to the outside through the NVDC charging unit 122 if the power source 110 is separated from the mobile device 200. In FIG. 3, the countercurrent blocking switch 170 is a switch in which a FET and a diode are coupled to each other. If the power source 110 is separated from the mobile device 200, power output from the battery 140 is blocked by the diode and the FET and is not exposed to the outside.

Figure 4:
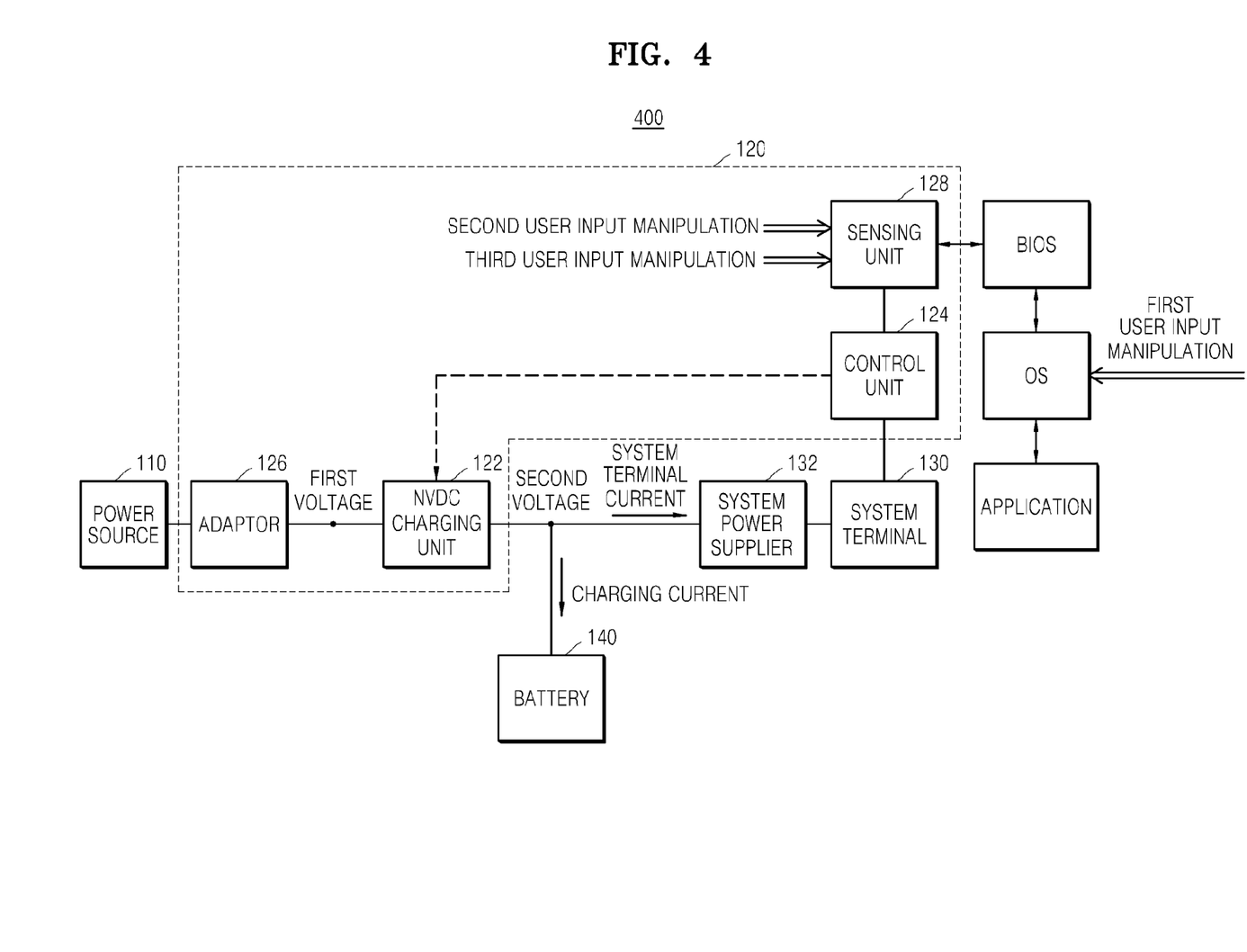
FIG. 4 is a block diagram of a mobile device including a charging apparatus, according to another embodiment of the present inventive concept.

FIG. 4 is a block diagram of a mobile device 400 including the charging apparatus 120, according to another embodiment of the present inventive concept. The elements of FIG. 4 corresponding to those of FIG. 1 denote the same reference numerals, and redundant descriptions between FIGS. 1 and 4 will be omitted.

Referring to FIG. 4, the charging apparatus 120 shown in FIG. 4 may further include a sensing unit 128 compared to the charging apparatus 120 shown in FIG. 1.

The sensing unit 128 senses at least one of a user input manipulation for the mobile device 400, a current (a system terminal current) consumed by the system terminal 130 of the mobile device 400, and a capacity of the battery 140. The control unit 124 controls the NVDC charging unit 122 to adjust a charging current based on a sensing result of the sensing unit 128.

The control unit 124 determines the user input manipulation for the mobile device 400 sensed by the sensing unit 128, and determines whether a status of the system terminal 130 of the mobile device 400 is in an on status, an off status, or a standby status.

The on status refers to a status in which the mobile device 400 is turned on, the off status refers to a status in which the mobile device 400 is turned off, and the standby status is a power saving status and refers to a status in which a part of the system terminal 130 of the mobile device 400 is turned on.

In a notebook, the on status may be a status S0, the off status may be a status S5, and the standby status may be one of statuses S1, S2, S3, and S4.

The user input manipulation for the mobile device 400 may be a user input manipulation of a power button for the mobile device 400, a user input manipulation of an input device such as a key board or a mouse, or a user input manipulation through an operating system (OS). The user input manipulation through the OS may be a manipulation for instructing an introduction of a power saving mode, a standby mode, or a power off mode. The sensing unit 128 senses the user input manipulation of the power button, the user input manipulation of the input device, or the user input manipulation through the OS. The control unit 124 determines that the status of the system terminal 130 is in the on status, the off status, or the standby status.

In FIG. 4, the user input manipulation through the OS indicates a first user input manipulation, the user input manipulation of the input device such as the key board or the mouse indicates a second user input manipulation, and the user input manipulation of the power button indicates a third user input manipulation. Although the user input manipulation includes the user input manipulation through the OS, the user input manipulation of the input device, and the user input manipulation of the power button, the input user manipulation may include various other manipulations according to a type of the mobile device 400.

The control unit 124 controls the NVDC charging unit 122 in such a way that the charging current output from the NVDC charging unit 122 is greater if the status of the system terminal 130 is in the standby status or off status than in the on status. The battery 140 may be more quickly charged by increasing the charging current since a current of the system terminal 130 is smaller if the status of the system terminal 130 is in the standby status or off status than in the on status.

The sensing unit 128 may sense the capacity of the battery 140. The control unit 124 controls the NVDC charging unit 122 in such a way that the greater the capacity of the battery 140, the higher the charging current. The capacity information of the battery 140 used by the control unit 124 may be previously set. If the capacity of the battery 140 sensed by the sensing unit 128 is equal to a previously set capacity of the battery 140, the control unit 124 allows a first charging current to be supplied to the battery 140. If the capacity of the battery 140 sensed by the sensing unit 128 is higher than the previously set capacity of the battery 140, the control unit 124 controls the NVDC charging unit 122 in such a way that a second charging current greater than the first charging current is supplied to the battery 140. The control unit 124 may more precisely control the charging current by setting a plurality of number of capacities of the battery 140.

The sensing unit 128 may directly measure a system terminal current consumed by the system terminal 130. The control unit 124 may control the NVDC charging unit 122 in such a way that the smaller the system terminal current measured by the sensing unit 128, the higher the charging current, and more delicately increase a charging speed of the battery 140.

In the charging apparatus 120 according to another embodiment of the present inventive concept, if the status of the system terminal 130 is in the on status, the control unit 124 may allow the first charging current to be supplied to the battery 140 if the capacity of the battery 140 is equal to the previously set capacity of the battery 140, and may allow the second charging current greater than the first charging current to be supplied to the battery 140 if the capacity of the battery 140 is higher than the previously set capacity of the battery 140. If the status of the system terminal 130 is in the off status or standby status, the control unit 124 may control the NVDC charging unit 122 in such a way that a third charging current greater than the first charging current is supplied to the battery 140 if the capacity of the battery 140 is equal to the previously set capacity of the battery 140, and that a fourth charging current greater than the third charging current is supplied to the battery 140 if the capacity of the battery 140 is higher than the previously set capacity of the battery 140.

Figure 5:
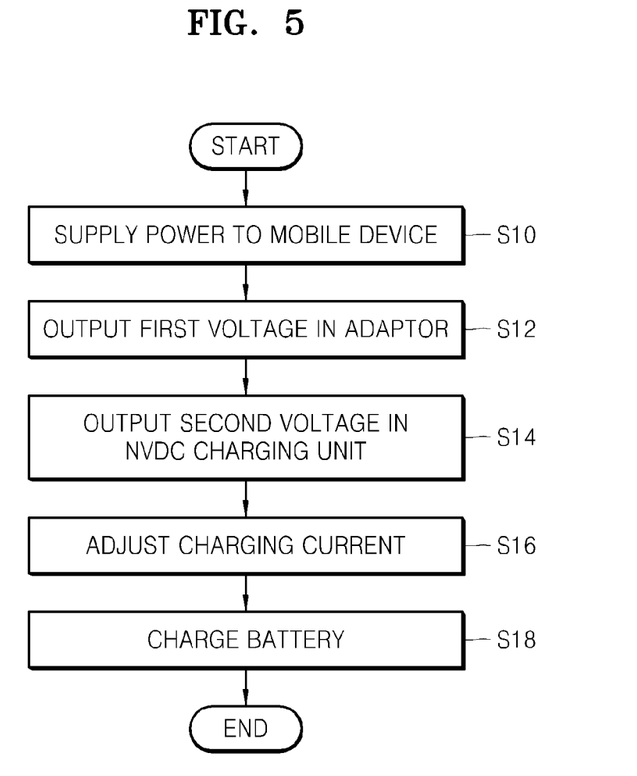
FIG. 5 is a flowchart of a charging method according to an embodiment of the present inventive concept.

FIG. 5 is a flowchart of a charging method 500 according to an embodiment of the present inventive concept.

Referring to FIG. 5, power is supplied to a mobile device from the power source 110 (operation S10). The power source 110 may be an AC power source or a DC source. If the power source 110 is the AC power source, an adaptor 126 is used to convert AC power into DC power and supply the DC power to the mobile device.

In operation S12, the adaptor 126 outputs the first voltage. The first voltage may be 19V.

In operation S14, the NVDC charging unit 122 changes the first voltage to the second voltage and outputs the second voltage.

In operation S16, the charging apparatus 120 adjusts a charging current supplied to the battery 140 based on the status of the system terminal 130.

In operation S18, the battery 140 is charged by the charging current.

The charging apparatus 120 may include the NVDC charging unit 122, the control unit 124 and the adaptor 126. Power supplied from the power source 110 is supplied to the battery 140 through the adaptor 126 and the NVDC charging unit 122, and may adjust the charging current supplied to the battery 140.

The charging apparatus 120 may further include the sensing unit 128 that senses a user input manipulation for the mobile device. In this case, the control unit 124 determines the status of the system terminal 130 as one of an on status, an off status, and a standby status according to the user input manipulation sensed by the sensing unit 128. The user input manipulation includes an input manipulation of a power button of the mobile device, an input manipulation of a user input device, or a user input manipulation through an OS, but the present inventive concept is not limited thereto.

The control unit 124 controls the NVDC charging unit 122 in such a way that the charging current is greater if the status of the system terminal 130 is in the standby status or off status than in the on status. The battery 140 may be more quickly charged by increasing the charging current since a current of the system terminal 130 is smaller if the status of the system terminal 130 is in the standby status or the off status than in the on status.

Also, the sensing unit 128 determines a capacity of the battery 140 or measures a system terminal current consumed by the system terminal 130.

The control unit 124 controls the NVDC charging unit 122 in such a way that the greater the capacity of the battery 140 sensed by the sensing unit 128, the higher the charging current, and that the smaller the system terminal current, the higher the charging current. That is, the control unit 124 allows a charging speed of the battery 140 not to be reduced as the capacity of the battery 140 increases, and allows the charging speed of the battery 140 to increase by increasing the charging current as the system terminal current consumed by the system terminal 130 is reduced.

Figure 6:
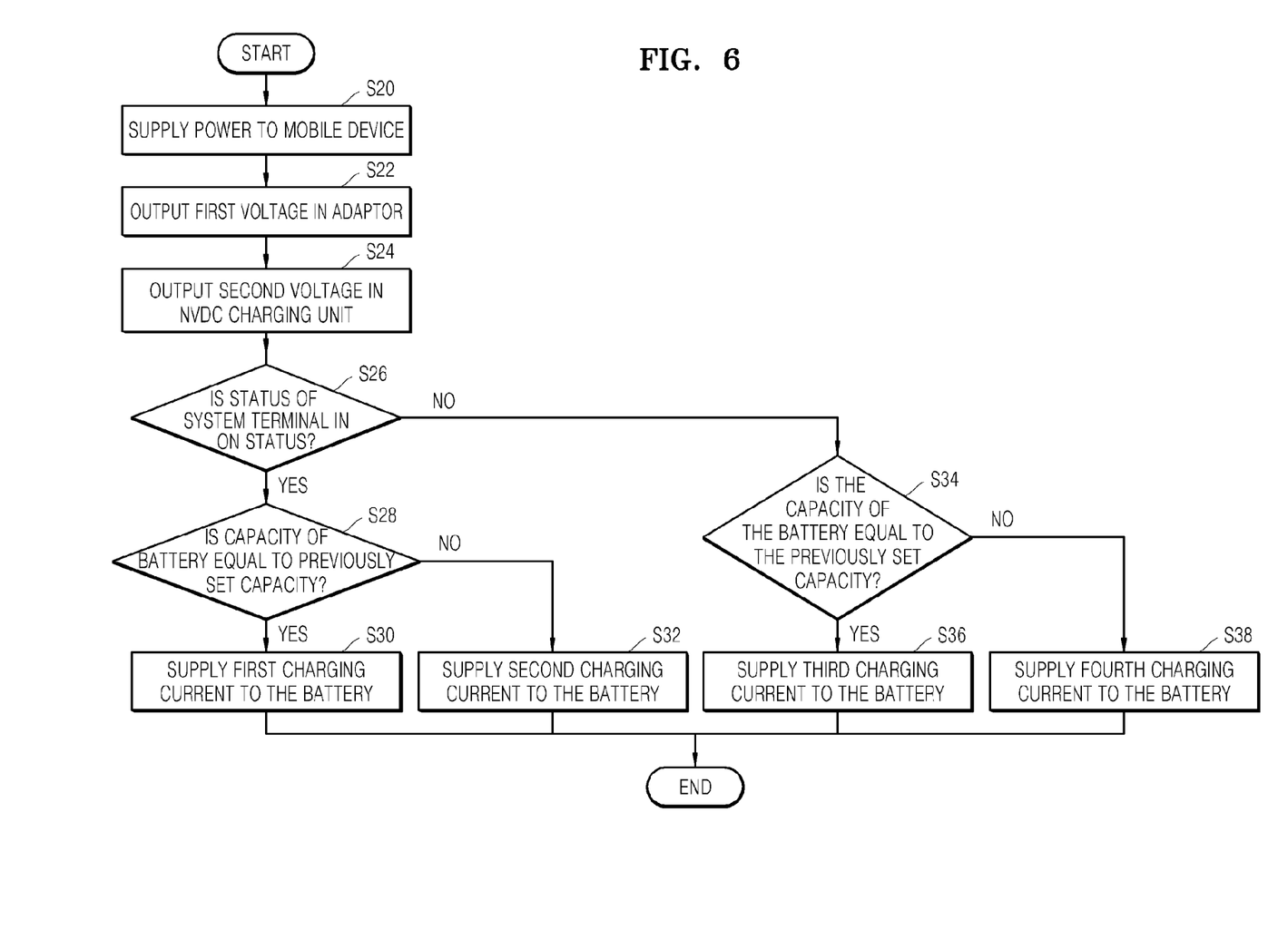
FIG. 6 is a flowchart of a charging method according to another embodiment of the present inventive concept.

FIG. 6 is a flowchart of a charging method according to another embodiment of the present inventive concept.

Referring to FIG. 6, the power source 110 is used to supply power to a mobile device (operation S20).

In operation S22, the adaptor 126 outputs the first voltage. The first voltage may be 19V.

In operation S24, the NVDC charging unit 122 changes the first voltage to the second voltage smaller than the first voltage and outputs the second voltage. The second voltage may be 9 to 12V.

In operation S26, The control unit 124 determines whether a status of the system terminal 130 is in an on status based on a user input manipulation sensed by the sensing unit 128.

In operation S28, If the system terminal 130 is in the on status, the control unit 124 determines whether a capacity of the battery 140 sensed by the sensing unit 128 is equal to a previously set capacity of the battery 140, and, if the capacity of the battery 140 is equal to the previously set capacity of the battery 140, the control unit 124 controls the NVDC charging unit 122 in such a way that a first charging current is supplied to the battery 140 (operation S30).

If the capacity of the battery 140 is higher than the previously set capacity of the battery 140, the control unit 124 controls the NVDC charging unit 122 in such a way that a second charging current greater than the first charging current is supplied to the battery 140 (operation S32).

If the system terminal 130 is in a standby status or an off status according to the user input manipulation sensed by the sensing unit 128, the control unit 124 determines whether the capacity of the battery 140 is equal to the previously set capacity of the battery 140 (operation S34).

If the capacity of the battery 140 is equal to the previously set capacity of the battery 140, the control unit 124 allows a third charging current greater than the first charging current to be supplied to the battery 140 (operation S36), and, if the capacity of the battery 140 is higher than the previously set capacity of the battery 140, allows a fourth charging current greater than the third charging current to be supplied to the battery 140, and thus the battery 140 is charged (operation S38).

EXPERIMENT EXAMPLE

TABLE 1

| status of the system terminal | capacity of the battery | charging current | charging time |
| --- | --- | --- | --- |
| standby status or off status | 58 Wh | 4.16 A | 1.2 hrs |
|  | 87 Wh | 6.24 A | 1.2 hrs |
| on status | 58 Wh | 2.6 A | 2.5 hrs |
|  | 87 Wh | 3.9 A | 2.5 hrs |

Table 1 shows experiment results obtained by adjusting charging current according to a capacity of the battery 140 and measuring charging time thereof when the system terminal 130 is in an off status or a standby status and in an on status.

If the status of the system terminal 130 is in the on status, and if the capacity of the battery 140 sensed by the sensing unit 128 is 58 Wh, the control unit 124 allows a charging current of 2.6 A to be supplied to the battery 140. If the charging current of 2.6 A is supplied to the capacity of the battery 140 of 58 Wh, a charging time of the battery 140 is 2.5 hour. If the capacity of the battery 140 is 87 Wh, the control unit 124 allows the charging current of 3.9 A to be supplied to the battery 140. In this regard, the charging time of the battery 140 is 2.5 hour.

If the status of the system terminal 130 is in the off status or the standby status, and if the capacity of the battery 140 sensed by the sensing unit 128 is 58 Wh, the control unit 124 allows a charging current of 4.16 A to be supplied to the battery 140. If the charging current of 4.16 A is supplied to the capacity of the battery 140 of 58 Wh, the charging time of the battery 140 is 1.2 hour. If the capacity of the battery 140 is 87 Wh, the control unit 124 allows the charging current of 6.2 A to be supplied to the battery 140. In this regard, the charging time of the battery 140 is 1.2 hour.

The charging methods according to one or more embodiments of the present inventive concept described with reference to FIGS. 5 and 6 have the same technical idea as that of the charging apparatus according to one or more embodiments of the present inventive concept described with reference to FIGS. 1 through 4. Therefore, the detailed operations of the charging methods according to one or more embodiments that are redundant with the operations described with reference to FIGS. 1 through 4 are skipped.

The charging apparatus and charging methods according to one or more embodiments of the present inventive concept described above have the following effects.

(1) A battery of a mobile device can be quickly charged while increasing the battery consuming time. (2) The battery can be quickly charged while a portability of the mobile device is maintained.

The above-described methods may be provided in the form of computer programs and may be implemented in general-use digital computers that execute the programs using a computer readable recording medium. The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A charging apparatus comprising:
   an adaptor to receive power from a predetermined power source and output a first voltage;
   a narrow voltage direct current (NVDC) charging unit to convert the first voltage into a second voltage lower than the first voltage, and supply power to a battery and a system terminal of a mobile device;
   a control unit to control the NVDC charging unit to adjust a charging current to be supplied to the battery based on a status of the system terminal; and
   a sensing unit to sense a capacity of the battery,
   wherein, if the status of the system terminal is in the on status, the control unit to control the NVDC charging unit to adjust the charging current to a first charging current when the capacity of the battery is equal to a previously set capacity of the battery, and adjust the charging current to a second charging current greater than the first charging current when the capacity of the battery is higher than the previously set capacity of the battery.

2. The charging apparatus of claim 1, wherein the second voltage is 9 to 12 V.

3. The charging apparatus of claim 1, wherein
   the sensing unit senses a user input manipulation for the mobile device,
   wherein the control unit determines the status of the system terminal according to the user input manipulation sensed by the sensing unit.

4. The charging apparatus of claim 3, wherein the status of the system terminal is one of an on status, a standby status, and an off status,
   wherein the control unit controls the NVDC charging unit in such a way that the supplied charging current is greater if the status of the system terminal is in the standby status or the off status than in the on status.

5. The charging apparatus of claim 1, wherein, if the status of the system terminal is in the standby status or the off status, the control unit allows a third charging current greater than the first charging current to be supplied to the battery if the capacity of the battery is equal to the previously set capacity of the battery, and allows a fourth charging current greater than the third charging current to be supplied to the battery if the capacity of the battery is higher than the previously set capacity of the battery.

6. The charging apparatus of claim 1, wherein
   the sensing unit measures a system terminal current consumed by the system terminal,
   wherein the control unit controls the NVDC charging unit to increase the supplied charging current as the system terminal current is reduced.

7. The charging apparatus of claim 1, wherein
   the sensing unit senses the capacity of the battery,
   wherein the control unit controls the NVDC charging unit to increase the supplied charging current as the capacity of the battery increases.

8. A method of charging a battery of a mobile device by using a predetermined charging device, the method comprising:
   (a) receiving power from a predetermined power source and outputting a first voltage;
   (b) converting the first voltage into a second voltage lower than the first voltage, and supplying power from the second voltage to a battery and a system terminal of a mobile device;
   (c) adjusting a charging current supplied to the battery based on a status of the system terminal;
   (d) charging the battery with the charging current; and
   (f) sensing a capacity of the battery,
   wherein operation (c) comprises: if the status of the system terminal is in the on status, adjusting the charging current to a first charging current when the capacity of the battery is equal to a previously set capacity of the battery, and adjusting the charging current to a second charging current greater than the first charging current when the capacity of the battery is higher than the previously set capacity of the battery.

9. The method of claim 8, wherein the second voltage is 9 to 12 V.

10. The method of claim 9, further comprising:
    (e) sensing a user input manipulation for the mobile device, and determining the status of the system terminal.

11. The method of claim 10, wherein the status of the system terminal is one of an on status, a standby status, and an off status, wherein operation (c) comprises: adjusting the charging current to be greater if the status of the system terminal is in the standby status or the off status than in the on status.

12. The method of claim 8, wherein operation (c) comprises:
if the status of the system terminal is in the standby status or the off status, allowing a third charging current greater than the first charging current to be supplied to the battery if the capacity of the battery is equal to the previously set capacity of the battery, and allowing a fourth charging current greater than the third charging current to be supplied to the battery if the capacity of the battery is higher than the previously set capacity of the battery.

13. The method of claim 8, further comprising:
(g) measuring a system terminal current consumed by the system terminal,
wherein operation (c) comprises: increasing the charging current as the system terminal current is reduced.

14. The method of claim 8, further comprising:
(h) sensing the capacity of the battery,
wherein operation (c) comprises: increasing the charging current as the capacity of the battery increases.

15. A non-transitory computer-readable storage medium storing a computer program for executing a method of charging a battery of a mobile device by using a predetermined charging device, the method comprising:
receiving power from a predetermined power source and outputting a first voltage;
converting the first voltage into a second voltage lower than the first voltage, and supplying power from the second voltage to a battery and a system terminal of a mobile device;
adjusting a charging current supplied to the battery based on a state of the system terminal; and
charging the battery with the charging current
sensing a capacity of the battery,
wherein the adjusting comprises: if the status of the system terminal is in the on status, adjusting the charging current to a first charging current when the capacity of the battery is equal to a previously set capacity of the battery, and adjusting the charging current to a second charging current greater than the first charging current when the capacity of the battery is higher than the previously set capacity of the battery.

* * * * *